United States Patent [19]

Fourel

[11] Patent Number: 5,607,064
[45] Date of Patent: Mar. 4, 1997

[54] CYCLE FIXING DEVICE FOR USE ON A CYCLE RACK AND CYCLE RACK INCORPORATING THIS DEVICE

[76] Inventor: Pascal Fourel, 102 Avenue Pasteur, 35400 Saint Malo, France

[21] Appl. No.: 390,536

[22] Filed: Feb. 17, 1995

[30] Foreign Application Priority Data

Feb. 24, 1994 [FR] France .................................. 94 02110

[51] Int. Cl.[6] .................................................. E05B 73/00
[52] U.S. Cl. ................................................. 211/5; 211/22
[58] Field of Search ................................ 211/5, 22, 94, 211/94.5; D12/114, 115, 118, 120; 70/235, 233; 248/351, 354.4, 354.6

[56] References Cited

U.S. PATENT DOCUMENTS

| 607,795 | 7/1898 | Gallaway | 70/235 X |
|---|---|---|---|
| 3,528,578 | 9/1970 | Schoenberger | 414/462 |
| 3,841,119 | 10/1974 | Kaufmann | 70/233 X |
| 4,126,228 | 11/1978 | Bala et al. | 211/5 |
| 4,524,893 | 6/1985 | Cole | 211/5 X |
| 5,278,538 | 1/1994 | Ainsworth et al. | 70/235 X |

FOREIGN PATENT DOCUMENTS

| 547741 | 10/1957 | Canada | 211/22 |
|---|---|---|---|
| 2412481 | 9/1974 | Germany | 70/235 |
| 3912692 | 11/1989 | Germany . | |
| 92172326 | 4/1993 | Germany . | |
| 2245238 | 1/1992 | United Kingdom | 70/235 |
| 9002669 | 3/1990 | WIPO . | |

*Primary Examiner*—Ramon O. Ramirez
*Assistant Examiner*—Sandra Snapp
*Attorney, Agent, or Firm*—Bachman & LaPointe, P.C.

[57] ABSTRACT

A fixing device for cycle racks of the so-called "upright" type is in two parts. The first part comprises a removable support. It is attached to the bottom tube of the frame of the cycle by adjustable tension clips and includes a hook. A cover hides the means for adjusting the clips. The second part is attached to the fork which is mobile in rotation on the cycle rack. It includes a spring catch in a box in which the hook is engaged. A ring releases the spring catch. The spring catch can be locked by a key-operated anti-theft device.

10 Claims, 4 Drawing Sheets

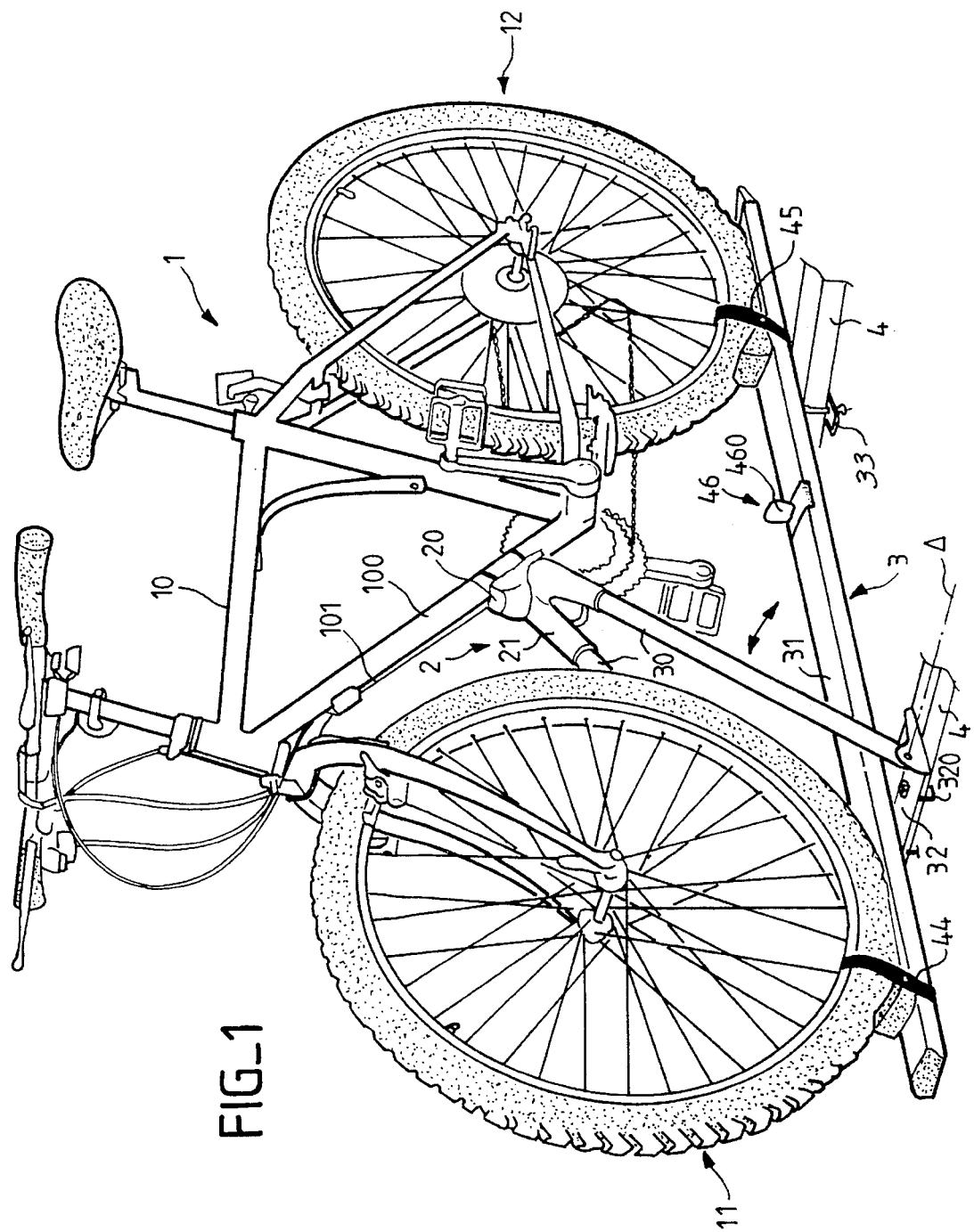
FIG_1

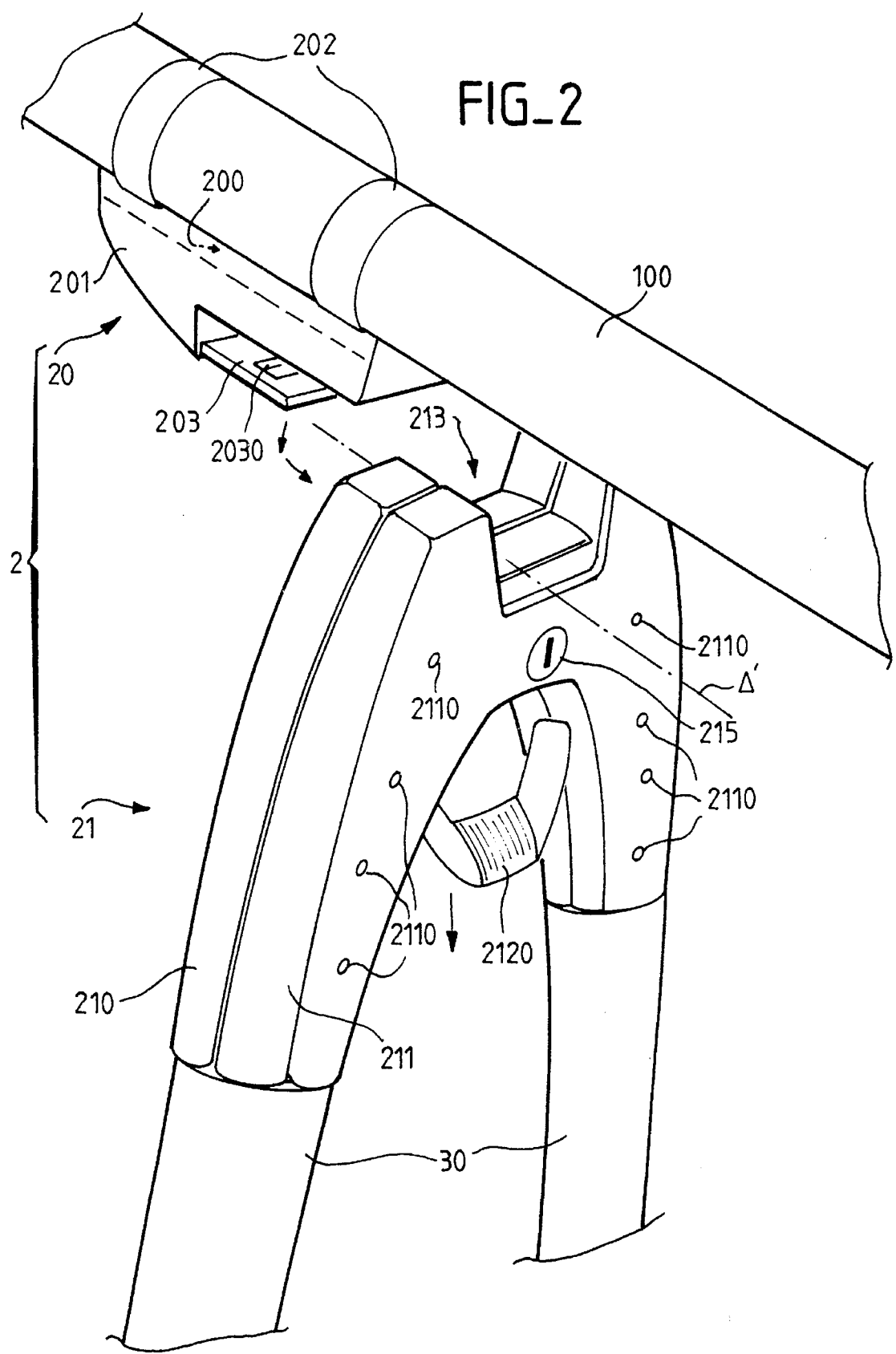
FIG_2

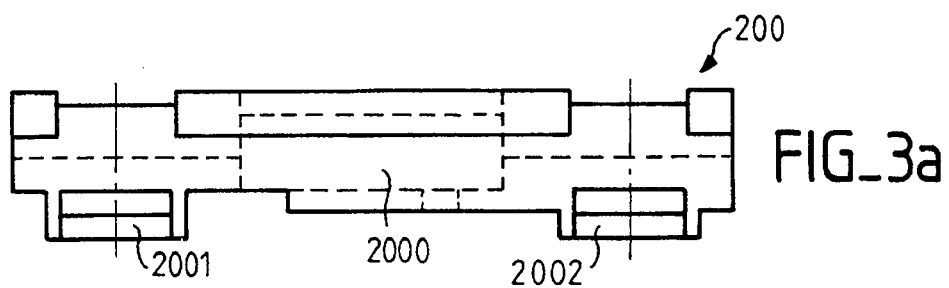
FIG_3a
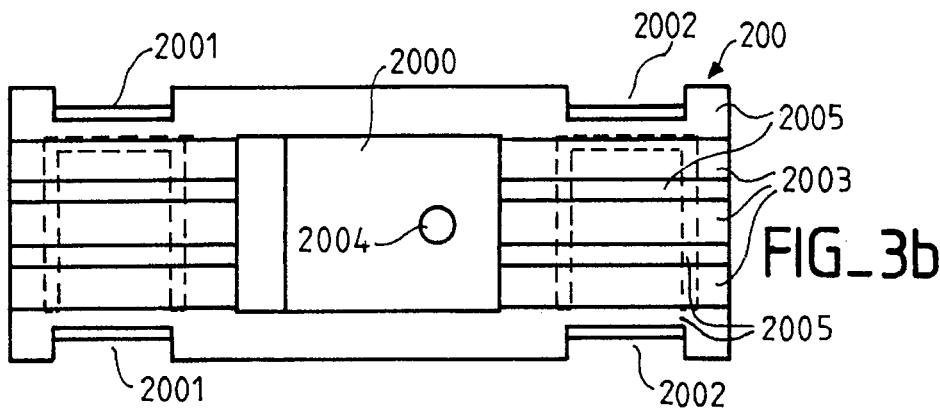
FIG_3b
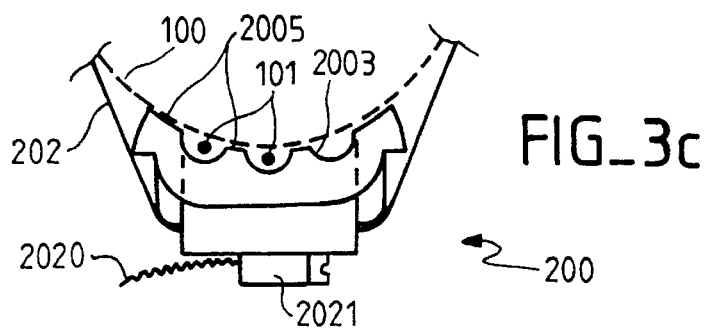
FIG_3c
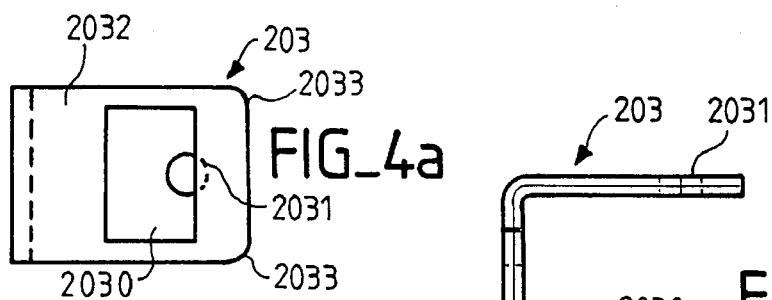
FIG_4a
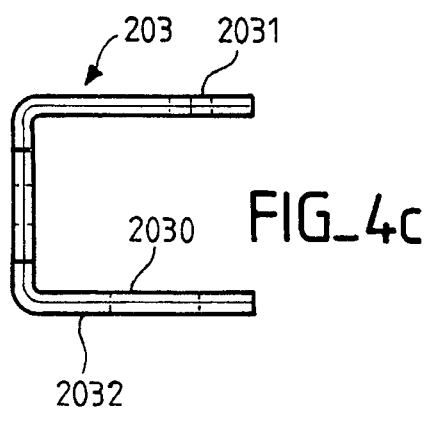
FIG_4c
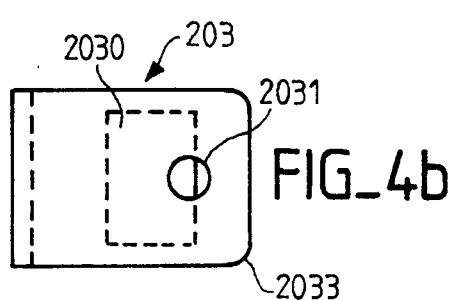
FIG_4b

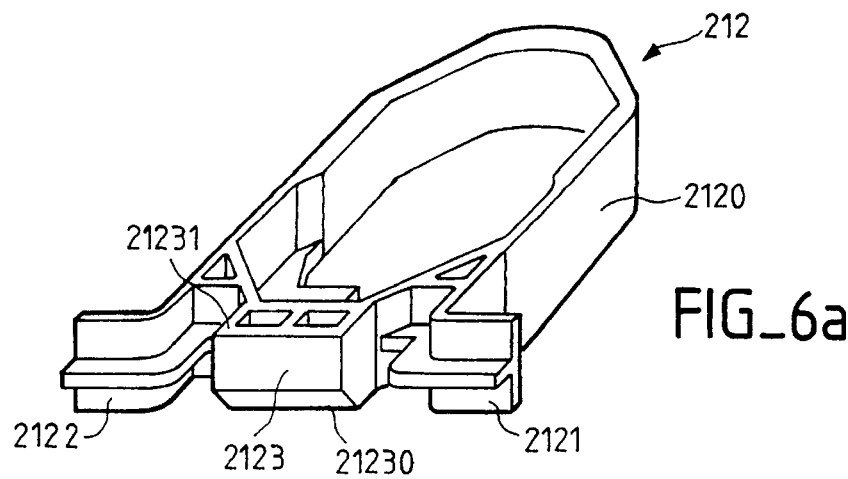
FIG_6a
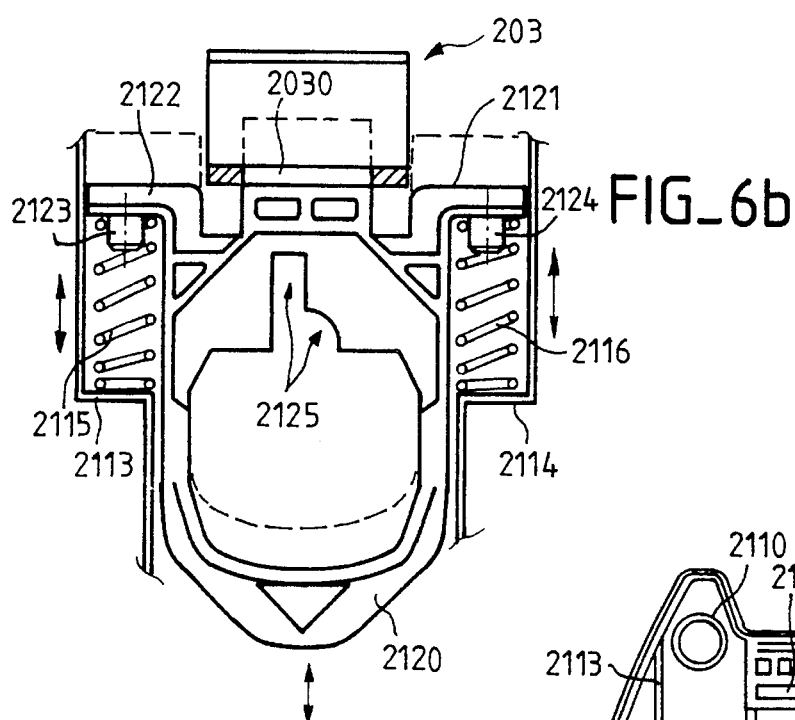
FIG_6b
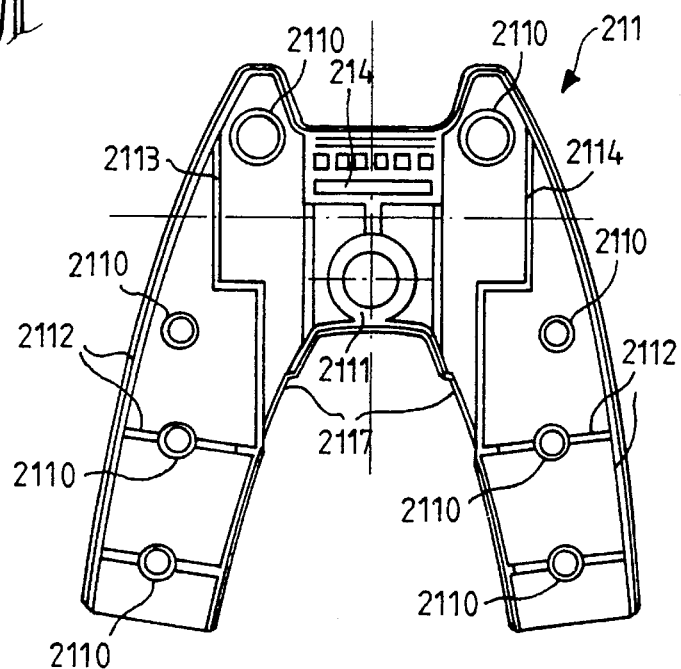
FIG_5

CYCLE FIXING DEVICE FOR USE ON A CYCLE RACK AND CYCLE RACK INCORPORATING THIS DEVICE

BACKGROUND OF THE INVENTION

1. Field of the Invention

The invention concerns a cycle fixing device for a cycle rack and in particular for a so-called "upright" type cycle rack. The cycle in a cycle rack of this kind is held in a vertical position.

The invention also concerns a cycle rack including a fixing device of this kind.

2. Description of the Prior Art

In the context of the invention, the term cycle is to be understood in its widest sense: man's, woman's or child's bicycle, racing bike, "all terrain" bike (ATR), motorcycle, etc.

These cycle racks are usually employed to carry cycles on the roof or on the trunk of an automobile vehicle. They are fitted onto a roof rack or onto bars attached to the vehicle.

For simplicity, in the following description, the cycle rack will be referred to as a "bike rack", which is its usual name. Likewise, the various kinds of cycle are all referred to as "bikes".

Many types of bike rack are available on the market. Some require the wheels to be removed, but in most cases the fixing means do not require this.

The first bike racks to be introduced were such that the cycle was fixed by the saddle and the handlebars, upside down. Fixing the bike was somewhat complicated and time consuming.

In the last few years bike racks have been generally adopted in which the bike is fixed vertically, but in its natural position, i.e. the right way up.

Bike racks of this kind have one or more arms (usually two). The lower end of the fixed arm (or of each fixed arm) is fixed to a support and can usually pivot about an axis. The upper end (or each upper end) carries a jaw type member adapted to fit around a tube of the bike frame.

There are numerous designs of this kind, the most usual ones being as follows: large clamp, small articulated jaws or cam system.

With regard to the bikes themselves, the designs on offer are tending to diversify to meet ever more specific requirements. As a result the general shape of the bike frame varies from one type to another, as do the specifications of the tubes from which the frames are made. The diameter of the tubes (when they are cylindrical) or more generally their dimensions (when they are oblong in shape) vary significantly from one manufacturer to another, and possibly from one model to another from the same manufacturer.

A first problem that arises is that of adapting the fixing devices of bike racks to these various configurations. It is clear that embodiments which use a large clamp or a small jaw can accommodate only slight variations in the diameter of circular cross-section tubes around a mean value. Their application is in practise to circular cross-section tubes of small diameter, typically in the range 30 mm to 60 mm. Given also that oblong cross-section tubes usually have a low resistance to compression, it is equally clear that these embodiments are hardly suited to this type of tube. There would be a risk of distortion of the tube unless jaws or clamps were employed for a single size of tube, i.e. matching the exterior cross section of the tube. Cam systems offer greater flexibility and accept tubes with diameters varying over a wider range although at the cost of increased complexity. To some extent, they also cater for oblong cross-section tubes, although the risk of distortion mentioned about is not eliminated.

Another requirement of many users of such devices is to be able to attach the bike to the bike rack simply and very quickly. Most prior art devices require a large number of manipulations. It follows that the fixing of the bike to the bike rack is often complicated and time-consuming.

Finally, the fixing device must offer the user an acceptable level of security against theft, when the bike is fixed to the bike rack. This means that a thief must not be able to remove the bike from its support simply and quickly and without using special tools: hacksaw, bolt-cutters, etc.

An object of the invention is to overcome the drawbacks of the prior art devices and at the same time to meet the requirements as stated above.

SUMMARY OF THE INVENTION

To this end the fixing device of the invention comprises first means fixed permanently to the frame of the bike and having a hook. In a preferred embodiment of the invention these means are simply fixed to the frame using adjustable clips. These clips are then enclosed in a closed box, for example a box with a snap-on lid, to make them inaccessible from the outside.

This box also supports the hook.

The bike rack has a support and two tubes forming forks pivoting at the bottom about an axis. The upper end includes locking means adapted to receive the hook. These locking means include a spring catch which immobilizes the hook when it is engaged inside them.

The whole is advantageously completed by a key-operated locking system for locking the hook inside the locking means.

In a preferred embodiment of the bike rack in accordance with the invention the support with which the bike rack is provided also has a hook which is inserted in the locking means when the two tubes forming the fork are folded against the support in a non-operative position.

The invention therefore consists in a fixing device for a cycle having a tubular frame for a cycle rack of the type including a support structure adapted to support the frame of the cycle in an upright position, which device comprises first fixing means fastened to said frame and including at least one hook and second fixing means fastened to the cycle rack and including a spring catch cooperating with said hook for temporarily locking first and second fixing means when the hook is engaged in the second fixing means.

The invention also consists in a cycle rack including a fixing device of this kind.

The fixing device of the invention therefore meets the stated objectives. It caters for tubes of extremely varied size and shape and offers virtually instantaneous fixing by simple clipping of a hook. The geometry of the frame is virtually irrelevant. The part of the fixing means carrying the hook is fitted and adjusted once and for all. The fixing operation (clipping of the hook) requires only one hand, so that the other hand remains free to hold the bike.

The locking device can easily be fitted with a conventional anti-theft device offering sufficient security in most cases.

The invention will be more clearly understood and other features and advantages of the invention will emerge from a reading of the following description with reference to the appended drawings.

BRIEF DESCRIPTION OF THE DRAWINGS

FIG. 1 is a perspective view of the bike rack and the fixing device of a preferred embodiment of the claimed invention.

FIG. 2 is a broken away perspective view of the fixing device.

FIG. 3a is a side elevational view of the first part of the fixing device.

FIG. 3b is a top plan view of the first part of the fixing device.

FIG. 3c is a front elevational view of the first part of the fixing device.

FIG. 4a is a top plan view of the hook element of the first part of the fixing device.

FIG. 4b is a bottom plan view of the hook element of the first part of the fixing device.

FIG. 4c is a side elevational view of the hook element of the first part of the fixing device.

FIG. 5 is a cross-sectional view of the box element of the second part of the fixing device.

FIG. 6a is a perspective view of the spring catch element of the second part of the fixing device.

FIG. 6b is a top plan view of the spring catch element of the second part of the fixing device.

DETAILED DESCRIPTION OF THE PREFERRED EMBODIMENTS

FIG. 1 is a general view showing a bike rack 3 including a fixing device in a preferred embodiment of the invention. Without this being limiting in an way on the scope of the invention, the example shown assumes that the bike 1 to be carried on the bike rack 3 is of the ATB type. The configuration of the bike rack itself differs little from that of prior art bike racks. The bike rack 3 conventionally includes a support in the form of an elongate beam 31. The front and back wheels 11, 12 of the bike 1 are placed on the beam 31. Tubes 30 form forks adapted to support the frame 10 by means of a fixing device 2. The wheels 11 and 12 are attached by means of a conventional system of straps or the like 44 and 45. These straps are attached to the beam 31 by any appropriate means. The tubes pivot about an axis Δ orthogonal to the longest dimension of the beam 31. To be more precise, as shown in FIG. 1, a plate 32 is attached to the beam 31 in an area which is advantageously towards the front of the latter. In an operative position the fork consisting of the two tubes 30 is raised so that the bottom tube 100 of the frame 10 of the bike 1 is in contact with the fixing device 2. The fork can be folded against the beam 31 ("inoperative" position) when the bike 1 is not on the bike rack 3.

A bike rack 1 of this kind is usually intended for carrying a bike on the roof or on the trunk of an automobile vehicle. To this end it is fixed to a roof-rack or to a pair of bars 4, as shown in FIG. 1. Conventional demountable screw-type fixing means are provided: in the example shown these are means 320 attached to the plate 32 at the front end of the beam 31 and means 33 attached to the beam 31 at the rear.

As already mentioned, the prior art fixing devices are based on clamps, jaws or similar members. It is obvious that, depending on the configuration of the frame 10 (i.e. on its shape and on the diameter of the cross-section of the tube 100 (if of circular cross section) or more generally on the dimensions of its cross-section (if of oblong cross-section)) adjustments are required that may be complex and time-consuming. Also, a given fixing device can accommodate only a restricted range of dimensions and shapes of the tubes 100.

The invention provides a fixing device 2 which overcomes this drawback. This device is described in more detail with reference to FIG. 2. It is essentially in two parts.

A first part 20 is attached to the tube 100 of the bike 1. It remains on the tube 100 at all times. This part is described in more detail below. It includes a plate 200 attached, in a preferred embodiment of the invention, by adjustable clips 202 around the tube 100. These clips are available in the trade under various trade names: they usually have a body constituted by a tongue which is notched, at least at its end, and a clamping screw which adjusts the diameter of the inside cross-section of the clip and the tension in it. A cover 201 is fixed (e.g. clipped) to the plate 200. The cover 201 conceals the adjustment means for tightening the clips (the screws, for example) and renders them inaccessible from the outside. Finally, in accordance with an important feature of the invention, a hook 203 is provided. In the example shown the visible part of the hook (the part outside the box 200–201) takes the form of a flat blade including a central orifice 2030 parallel to the tube 100. As explained below, this hook cooperates with the second part 21 of the fixing device 2.

This second part essentially comprises a box made up of two parts 210 and 211 fitted at the bottom around the tubes 30. Conventional means 2110 (adhesive bonding, riveting, etc) are used to fix together the two members 210 and 211 and to fix them to the tubes 30. The upper part of this assembly includes a cradle-shaped passage 213 which is adapted to receive the cover 201 at the first part 20 of the fixing device. Inside the upper part of the members 210 and 211 is a spring catch (not visible in this figure). A passage 214 extends through the assembly in a direction Δ' substantially parallel to the tube 100. The hook 203 can be engaged in this passage. Once fully inserted into the passage 214, the hook is locked by the spring catch. A tab or ring 2120 under the members 210 and 211, inside the fork formed by the tubes 30, is used to release the spring catch. Only this part of the spring catch is accessible from outside the box. Because of its position the ring 2120 is easily accessible even if the bike 1 is on the bike rack 3. The system can advantageously be completed by a key-operated lock 215 which immobilizes the spring catch as an anti-theft measure.

Fitting the member 20 naturally involves some adjustment. In particular, it must be positioned at an appropriate place on the tube 100. The clips 202 must then be tightened and the cover 201 fitted. However, these operations are carried out once only, are not particularly complex and do not require much in the way of tools (just a screwdriver, for example). Also, this tool (not shown) can be supplied with the fixing device and integrated into the cover 201. Thereafter the part 2 of the fixing device complete with its hook 203 remains on the bike at all times. It is locked to the bike rack in a very simple manner and virtually instantaneously, as already described: the hook 203 is inserted in the passage 214 and locked simply by movement along an axis Δ' parallel to the tube 100. To be more precise, this movement is achieved by swinging up the fork comprising the tubes 30, which pivot about the axis Δ (FIG. 1). This maneuver can be performed with one hand, the other hand being free to steady the bike 1.

Finally, in a preferred embodiment of the invention, the fixing device has a key operated anti-theft device 215, as shown in FIG. 2. The catch can thus be locked.

It is just as simple to release the bike 1 from the bike rack: after unlocking the anti-theft device 215 using the key, if necessary, all that is required is to pull down on the tab 2120. This unlocks the spring catch immobilizing the hook 203, as described below.

As in prior art bike racks it is naturally necessary to begin by unfastening the clamps 44 and 45 or like fixing means around the wheels which attach them to the beam 31 (FIG. 1) of the bike rack 3.

When the bike has been removed the fork consisting of the tubes 30 can be folded down against the beam 31. A member 46 comprising a hook similar to the hook 203 is advantageously provided (see FIG. 1). This also has a central orifice 460 whose purpose emerges below. When the tubes 30 and the fixing device 2 supported by them are folded down, the hook 46 is inserted into the slot 214, from the opposite side to that from which the hook 203 is inserted in the operative position. It follows that the fork constituted by the tubes 30 will then remain locked in this position. All that is required to unlock it is, as previously, to apply traction to the tab 2120.

A more detailed description follows of one embodiment of various components of the two parts 20 and 21 of the fixing device 2 of the invention.

FIGS. 3a through 3c show one embodiment of the plate 200 respectively seen from the side, from below and from in front. The plate has a body 2000 whose wall 2005 which comes into contact with the tube 100 of the frame 10 of the bike 1 is inscribed within a part-cylinder so as to mate optimally with the curved shape of the tube 300. In a preferred embodiment of the invention this wall 2005 incorporates longitudinal grooves 2003. Three such grooves are shown in FIGS. 3b and 3c, by way of example only. They are intended to provide space for the brake and gear cables: two cables 101 are shown in FIG. 3c. These grooves advantageously have a cylindrical cross-section to provide a close match to the exterior cross-section of the cables or their sheath. The body of the plate 2000 has lateral notches 2001 and 2002 for the clips 202. These surround the tube 100 (shown in dashed outline in FIG. 3c). The clamping member 2021 is disposed on the side opposite the side 2005 in contact with the surface of the tube 100. This is usually a member comprising a screw for adjusting the clamping action using a screwdriver. The screw meshes with notches 2020 in an end part of the clips. These arrangements both hold the plate 200 firmly against the tube and accommodate different sizes and/or different shapes of tubes (circular or oblong cross-sections). Because the plate can be made from a material having some plasticity and the pressure exerted by the clip is distributed homogeneously, the risk of crushing or distortion of the tube 100 is minimized, even where the tube has a very flat shape.

FIGS. 4a through 4c show one embodiment of a hook that can be used in the invention, respectively from below, from above and from the side. As FIG. 4c shows very clearly, the hook 203 has an inverted "U" shape. There is a central opening 2030 in the lower part (branch 2032) of the "U". In the example shown there is also a circular opening 2031 in the upper part. This allows it to be fixed (for example clipped) to the plate 200. To this end, the latter includes a lug 2004 (FIGS. 3b) in a central portion.

Once the plate 200 with its hook has been fitted, a cover 201 is fitted over it (FIG. 2) leaving visible and accessible only the branch 2032 of the "U", this being the branch including the central opening, as shown more clearly in FIG. 2. The cover 201 can clip on, for example, or be attached by any other conventional means. It renders the clamping means 2021 inaccessible from the outside (FIG. 3c). The corners 2033 of the branch 2032 can be rounded to facilitate insertion of the hook into the slot 214.

The second part 21 of the locking device 2 attached to the fork constituted by the tubes 30 will not be described in more detail with reference to FIGS. 5, 6a and 6b.

FIG. 5 shows one possible embodiment of the box member 210 or 211. In this case this is the member 211. The members advantageously include a polarizer so that the hook can be inserted only one way. An additional orifice 2111 is provided for the key operated lock 215 (FIG. 2). This orifice is in the upper part of the member 211, but under the slot 114. Downward-facing orifices 2117 provide a free passage for the branches of the ring 2120 operating the spring catch.

The inside of each member advantageously incorporated ribs 2112, 2113 and 2114 for strengthening the structure as a whole. The last two ribs 2113 and 2114 also have a special function, in that they also support the springs of the spring catch as explained below.

FIG. 6a is a perspective view of one possible embodiment of the spring catch 212 and its release ring 2120. The latter is the only part of the catch 212 that can be seen from outside the members 210 and 211, as shown more clearly in FIG. 2. The body of the catch includes two flanges 2121 and 2122 whose lower part (see FIG. 6b) has studs 2124 and 2126. Each stud is inserted in a respective coil spring 2115 and 2116. The lower part of these springs 2115 and 2116 rests on the ribs 2113 and 2114 of the member 211 (FIG. 5) which form a support for them. The central part 2123 of the catch projects and serves as the bolt. It has a bevelled front portion 21230. When the hook 203 is inserted in the slot 114 (FIG. 2), the latter bears on this bevelled portion 21230 and pushes down the catch 212. The flanges 2121 and 2122 compress the springs 2114 and 2115. FIG. 6b shows in full outline the position of the catch 212 when the hook 203 is partially inserted in the slot 114 (FIG. 2). The bolt 2123 then engages in the central orifice 2030 of the hook 203 and the catch 212 is pushed up by the springs 2114 and 2115 which return to their inoperative position shown in dashed outline in FIG. 6b. In this position the hook 203 is trapped by the bolt 2123, being trapped behind a steep wall 21231 opposite the bevelled portion 21230.

To release the catch 212 all that is required is to pull on the ring 2120 to compress the spring and to release the hook 203 which can then be withdrawn from the slot 114.

In a preferred embodiment of the invention the spring catch 212 is completed by a key-operated anti-theft device 215 (FIG. 2) to prevent operation of the release ring 2120 by immobilizing the body of the catch 212 in the locked position. Appropriate cut-outs 2125 are provided in the body of the catch 212 to act as a keeper for the bolt (not shown) of the anti-theft device.

It is clear from the foregoing description that the invention achieves the objects as stated and in combination: fixing suitable for all types of bikes, virtually instantaneous fixing and anti-theft locking.

Without this being limiting in any way on the scope of the invention, some examples of materials that can be used for the main components of the fixing device and the bike rack will now be mentioned.

The hook 203 is preferably made from stainless steel and the hook 46 (when present) from plastics material. The other parts of the fixing device: box members 210, 211; catch 212; plate 200 and cover 201 are made from a conventional plastics material such as polyamide. To attach the plate 200 to a tube of the bike frame, in the manner indicated, conventional screw-clips can be used, readily available in the trade. The springs 2115 and 2116 are conventional steel springs. The tubes 30 of the fork of the bike rack 3 and the support beam 31 can be made from steel, aluminum of aluminum alloy.

With reference to the plate 200, the radius of curvature of the wall 2005 facing the tube 100 is typically in the order of 30 mm. The grooves 2003 are semi-cylindrical with a radius of typically 3 mm.

However, it must be made clear that the invention is not limited to the embodiments specifically described, with particular reference to FIGS. 1 through 6b.

In particular, although these examples refer to a fixing device in two parts, one attached to the bike rack and the other installed in a preliminary fitting operation on the bike frame, in an alternative embodiment (not shown) the bike can be manufactured with a hook screwed or welded to the frame, and adjustable in position or fixed in position, for example. Of course, these bikes would be designed for a particular type of bike rack in accordance with the invention, in particular when the position of the hook is not adjustable. In this configuration the first part of the fixing device is reduced to the strict minimum, i.e. to a fixed or movable piece of metal integral with the frame of the bike.

As described, the fork comprising the two tubes 30 pivots about an axis Δ perpendicular to the greatest length of the bike frame. This covers most situations, assuming that the first part 20 (FIGS. 1 and 2) of the fixing device is correctly positioned on the bottom tube of the bike frame. At the cost of making the design of the fork more complicated, the capacity for adjustment can be increased by making the tubes in two parts which can slide one within the other, so that the length of the fork can be increased or reduced within a predetermined range. It must be clearly understood that, for a given bike, if this operation is required at all it is required once only, like the initial positioning of the first part of the fixing device.

The coil springs can be replaced by any spring means capable of applying a return force to the body of the spring catch: leaf springs, etc.

A number of clips other than two can be used. Although this latter configuration is particularly suitable, as it enables fixing of the plate in areas on either side of the central attachment point for the hook, it is nevertheless possible to use other arrangements. A single wide clip could be used, for example, and the hook fixed to one end of the plate.

Finally, the hook to which the second part 21 (FIGS. 1 and 2) of the bike fixing device is attached could be replaced by a simple dim or any other appropriate supporting structure, without departing from the scope of the invention.

I claim:

1. Fixing device for a cycle rack for a cycle having a tubular frame, said fixing device including a support structure adapted to support the frame of said cycle in an upright position, first fixing means fastened to said frame and including at least one hook and second fixing means fastened to said cycle rack and including a spring catch cooperating with said hook for temporarily locking said first and second fixing means when said hook is engaged in said second fixing means, said first fixing means being adjustable in position so that they can be attached in a given area of said frame of said cycle, and said hook being fixed to a support plate and said support plate includes removable clamping means for attaching it to said frame of said cycle.

2. Fixing device according to claim 1 wherein said removable clamping means comprise at least one adjustable tension clip around said support plate and a tubular member of said frame so as to fix said support plate in said given area.

3. Device according to claim 1 wherein said first fixing means further include a cover adapted to cover said support plate and said removable clamping means.

4. Device according to claim 1 wherein said support plate includes longitudinal passages recessed into a wall facing said given area of attachment on said frame so as to provide space for the sheath of cables operating functional units of said cycle and said wall is inscribed within a portion of a cylinder of particular radius.

5. Device according to claim 1 wherein said second means include a box formed of two hollow members enclosing said spring catch and allowing access from the outside to a ring for releasing said catch and said members have a slot in which said hook can be inserted.

6. Device according to claim 5 wherein said hook comprises at least one flat part having an opening in a central area, said spring catch has a central protuberance having a bevelled front area and two lateral flanges resting on one end of spring means whose other end rests on supports attached to said box, said hook bears on this bevelled area during inter-engagement of said first and second fixing means so as initially to depress said central protuberant area and to compress said spring means and then to lock said hook inside said second fixing means by insertion of said central protuberance in said central opening, said spring catch being pushed back by said spring means.

7. Fixing device according to claim 6 wherein said spring means comprise coil springs and said supports fastened to said box comprise ribs on the inside of said members constituting said box.

8. Fixing device according to claim 1 wherein said second fixing means include a key-operated anti-theft device for locking said spring catch.

9. Cycle rack comprising a fixing device according to claim 1.

10. Cycle rack according to claim 9 including an elongate support member in the form of a beam on which said cycle rests, said support structure comprises two tubes forming a fork supporting at one end said second fixing means and pivoting at its other end about an axis orthogonal to the greatest dimension of said elongate member, and said elongate member includes a second hook which engages with said spring catch when said fork is folded against said elongate member, this second hook having a central opening.

* * * * *